Nov. 17, 1931.   W. L. SHEPARD   1,832,794
UNIVERSAL JOINT
Filed Feb. 11, 1928
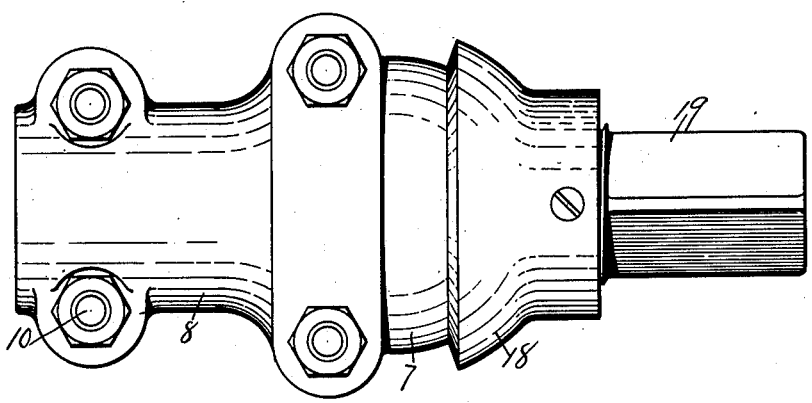
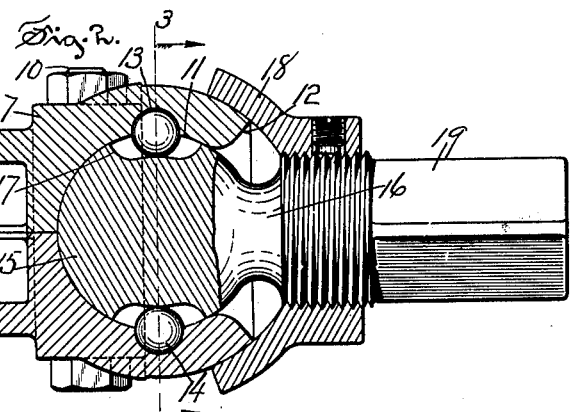
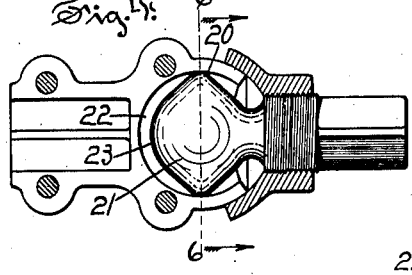
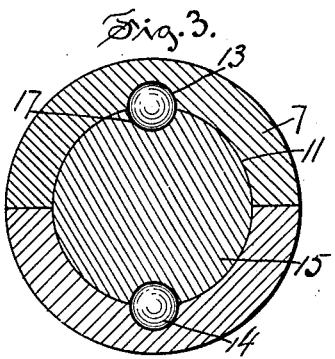
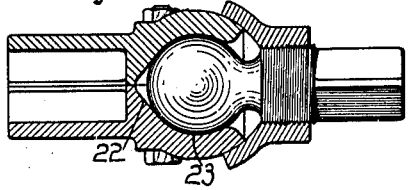

Patented Nov. 17, 1931

1,832,794

UNITED STATES PATENT OFFICE

WILBUR L. SHEPARD, OF WEST HARTFORD, CONNECTICUT

UNIVERSAL JOINT

Application filed February 11, 1928. Serial No. 253,725.

My invention relates to the class of devices that are used for uniting two sections of a shaft in a manner to permit them to be located at various angles with respect to each other, and an object of my invention, among others, is to provide a structure of this class that shall be simple in construction and particularly durable and efficient in operation.

One form of a universal joint embodying my invention and in the construction and use of which the objects herein set out, as well as others, may be attained is illustrated in the accompanying drawings, in which:

Fig. 1 is a side view of my improved universal joint.

Fig. 2 is a view in central lengthwise section through the same.

Fig. 3 is a view in cross section on a plane denoted by the dotted line 3—3 of Fig. 2.

Fig. 4 is a view in central lengthwise section through a universal joint embodying my invention, but of a little different construction from that shown in the preceding figures, the scale being reduced.

Fig. 5 is a view similar to Fig. 4 but looking from a point located at right angles to the point of view of Fig. 4.

Figure 6 is a view in cross section on a plane denoted by the dotted line 6—6 of Figure 4.

In the accompanying drawings the numeral 7 denotes the socket member of my improved joint that may be composed of any suitable metal, having a shank 8 with an opening 9 therein to receive the end of a shaft in a manner common to structures of this class. This socket member 7 comprises two pieces joined at substantially their cross-wire center and formed, when secured together as by means of bolts 10 and nuts thereon, with a socket 11 of substantially spherical form, and having a mouth 12 of reduced dimension and rounded at its inner edge. Recesses 13 are located preferably on diametrically opposite sides in the wall of the socket 11 and as shown in Fig. 2 of the drawings, these recesses being adapted to receive balls 14 that, while quite closely fitting the recesses, yet are sufficiently loose to rotate freely therein in the rocking movements of the joint members. These balls act as keys to transmit rotating movement of one of the joint sections to the other. A ball member of the joint is formed for attachment to the socket member 7 as by means of a head 15 of substantially spherical shape fitting within the socket 11 and having a neck 16 of reduced diameter located in the mouth 12 of the socket member, said neck being of such size that the ball member of the joint may be rocked from side to side in different directions and being curved longitudinally of the member to receive the rounded edge of the socket mouth. Grooves 17 are formed on diametrically opposite sides of the head 15 to receive the balls 14, and as shown in Fig. 2. The bottoms of these grooves are formed on arcs of circles struck from the center of the head 15, so that the balls, in rocking or tipping movements of the head 15 may be properly guided and supported.

A hood 18 is secured to the screw threaded stem 19 of the ball member of the joint, the recess in said hood being shaped to fit the spherical form of the outer surface of the socket member 7 and also being of a depth to cover the mouth 12 in the tipping or rocking movements of the ball member of the joint. The stem 19 is of non-spherical shape in cross-section similar to the cross sectional shape of the socket in the shank 8, the stem 19 being adapted to fit in a socket in the end of a section of shaft in a manner that will be readily understood.

From this it will be noted that a joint consisting of a few parts and therefore comparatively cheap to manufacture is provided while at the same time the device possesses maximum strength. The parts are so arranged that they are very simple in construction.

The joint just described embodies a socket member and a ball member located in the socket in the socket member, said socket and the head of the ball member having projections on one part engaged with the other part to impart rotating movement from one to the other while permitting relative rocking movement of said parts. In that form of device just described this connecting element comprises the balls 14. In that form of the structure shown in Figs. 4 to 6 inclusive, this connecting element is in the form of key projections 20 of tapered form and preferably round in cross section. The head 21 from which said projections extend is of oval shape as to one dimension, and as shown in Fig. 4, but in the other dimension located at right angles to the one just described the shape of the head is round, and as shown in Fig. 5. The ends of the projections 20, or terminals of the oval shaped portion of the head 21, extend into and move in a groove 22 formed in the recess 23 of the socket member 7 of the joint.

From this construction it will be seen that rocking movement of the joint sections in one direction is on the ends of the projections 20 as a pivot, and rocking movement in the opposite direction is permitted by a sliding movement of the projections in the groove 22. Other than this the two sections of the joint are of similar construction to that hereinbefore described with respect to the joint shown in Figs. 1 to 3.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A universal joint including a socket member longitudinally divided into several parts, means carried by the socket member for connecting its various parts, the socket therein having a constricted mouth, a member having a head to fit said socket and a reduced neck to receive the edge of said mouth, recesses formed in the opposite walls of said socket, grooves formed in the opposite sides of said head, balls located in said grooves and recesses, and a rigid hood secured to the member having the head and closely surrounding said socket member to close the opening into the mouth thereof and to aid in holding together the parts of said socket member.

2. A universal joint including a socket member longitudinally divided into two equal halves, means carried by the socket member for connecting its halves, the socket therein having a constricted mouth, a member having a head to fit said socket and a reduced neck to receive the edge of said mouth, a recess formed in the wall of each socket half at a point midway of its side edges, grooves formed in the opposite sides of said head, balls located in said grooves and recesses, and a rigid hood secured to the member having the head and closely surrounding said socket member to close the opening into the mouth thereof and to aid in holding together the halves of said socket member.

3. A universal joint including a socket member longitudinally divided into two equal halves, means carried by the socket member for connecting said halves, the socket therein having a constricted mouth, a member having a head to fit said socket, means for interconnecting the head and socket to provide a drive connection between the same and to permit lateral rocking movement in transverse directions, and a rigid hood secured to the member having the head and closely surrounding said socket member to close the opening into the mouth thereof and to aid in holding together the halves of said socket member.

4. A universal joint including a socket member longitudinally divided into several parts, means carried by the socket member for connecting its several parts, a member having a head to fit said socket, means interconnecting the socket member and the member having a head for transmitting rotary movement of one member to the other while permitting swinging movement thereof, and means carried by the member having a head for surrounding a portion of the socket member to assist in preventing separation of the various parts of the latter.

WILBUR L. SHEPARD.